(12) United States Patent
Gupte et al.

(10) Patent No.: US 12,392,417 B2
(45) Date of Patent: Aug. 19, 2025

(54) MULTI-FUNCTION VALVE ASSEMBLIES

(71) Applicant: FORD GLOBAL TECHNOLOGIES, LLC, Dearborn, MI (US)

(72) Inventors: Parikshit Gupte, West Bloomfield, MI (US); Giriraj Srinivasan, Troy, MI (US); Joseph Polizzi, Chesterfield, MI (US); Taylor McCarty, Oxford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 30 days.

(21) Appl. No.: 18/183,398

(22) Filed: Mar. 14, 2023

(65) Prior Publication Data

US 2024/0309958 A1 Sep. 19, 2024

(51) Int. Cl.
  *F16K 15/06* (2006.01)
  *B60L 50/60* (2019.01)
  *F16K 17/04* (2006.01)
  *F16K 17/196* (2006.01)
  *H01M 50/333* (2021.01)

(52) U.S. Cl.
  CPC .......... *F16K 15/066* (2013.01); *F16K 17/044* (2013.01); *H01M 50/333* (2021.01); *B60L 50/60* (2019.02); *F16K 17/196* (2013.01); *H01M 2200/20* (2013.01); *H01M 2220/20* (2013.01); *Y10T 137/7777* (2015.04); *Y10T 137/778* (2015.04)

(58) Field of Classification Search
  CPC .............. F16K 17/196; H01M 50/333; Y10T 137/3646; Y10T 137/7777; Y10T 137/778
  See application file for complete search history.

(56) References Cited

U.S. PATENT DOCUMENTS

| | | | | | |
|---|---|---|---|---|---|
| 3,625,248 | A | * | 12/1971 | Lhotellier | F16K 17/18 |
| | | | | | 137/493.6 |
| 4,498,493 | A | * | 2/1985 | Harris | B60K 15/0406 |
| | | | | | 220/203.26 |
| 4,561,559 | A | * | 12/1985 | Rutan | B60K 15/03519 |
| | | | | | 220/203.26 |
| 5,282,492 | A | * | 2/1994 | Angeli | F16K 17/196 |
| | | | | | 137/493.4 |

(Continued)

FOREIGN PATENT DOCUMENTS

| CN | 215527885 U | 1/2022 |
|---|---|---|
| DE | 102013213909 A1 | 1/2015 |

(Continued)

*Primary Examiner* — Robert K Arundale
(74) *Attorney, Agent, or Firm* — David B. Kelley; Carlson, Gaskey & Olds, P.C.

(57) ABSTRACT

Multi-function valve assemblies are provided for use in automotive components, such as traction battery packs, for example. An exemplary multi-function valve assembly may include a valve housing, a first valve body movably positioned within the valve housing, and a second valve body movably positioned within the valve housing. The first and second valve bodies may be moved between positions in which the valve bodies are seated against one another and other positions in which the valve bodies are unseated relative to one another to provide various valve functions. The multi-function valve assembly may be configured to provide functions such as degassing, pressure equalization, leak testing, etc.

18 Claims, 5 Drawing Sheets

(56) References Cited

U.S. PATENT DOCUMENTS

| | | |
|---|---|---|
| 8,268,469 B2 | 9/2012 | Hermann et al. |
| 8,778,519 B1 | 7/2014 | Frey et al. |
| 10,164,227 B2 | 12/2018 | Hofer |
| 10,424,770 B2 | 9/2019 | Gunther |
| 2003/0150492 A1* | 8/2003 | Sato ............... F16K 17/196 137/493.6 |
| 2005/0028869 A1* | 2/2005 | Roth ............... F16K 17/196 137/493.4 |
| 2012/0244399 A1 | 9/2012 | Tartaglia |
| 2021/0148478 A1 | 5/2021 | Yue et al. |
| 2021/0159473 A1 | 5/2021 | Han et al. |
| 2022/0090692 A1* | 3/2022 | Zhang ............ F16K 15/063 |
| 2023/0175602 A1* | 6/2023 | Goldsche ........ F16K 17/0413 137/540 |
| 2024/0047815 A1* | 2/2024 | Rink ............... H01M 50/3425 |

FOREIGN PATENT DOCUMENTS

| | | |
|---|---|---|
| DE | 102013219223 A1 | 3/2015 |
| DE | 102015011663 A1 | 7/2016 |
| WO | 2021219309 A1 | 11/2021 |
| WO | 2022003716 A1 | 1/2022 |

\* cited by examiner

MULTI-FUNCTION VALVE ASSEMBLIES

TECHNICAL FIELD

This disclosure relates to multi-function valve assemblies for use within automotive components.

BACKGROUND

Many automotive components require a gas-tight housing design. The components may also require pressure equalization due to temperature fluctuations.

SUMMARY

A multi-function valve assembly according to an exemplary aspect of the present disclosure includes, among other things, a valve housing, a first valve body movably positioned within the valve housing, and a second valve body movably positioned within the valve housing. The first valve body is seated against the second valve body in a default position of the multi-function valve assembly and is unseated relative to the second valve body in an additional position of the multi-function valve assembly.

In a further non-limiting embodiment of the foregoing multi-function valve assembly, the first valve body is degassing valve body, and the second valve body is a pressure equalization valve body.

In a further non-limiting embodiment of either of the foregoing multi-function valve assemblies, a biasing member is configured to bias the second valve body against the first valve body during the default position.

In a further non-limiting embodiment of any of the foregoing multi-function valve assemblies, a biasing member is configured to bias the first valve body against the valve housing during the default position.

In a further non-limiting embodiment of any of the foregoing multi-function valve assemblies, the additional position is a degassing position of the multi-function valve assembly.

In a further non-limiting embodiment of any of the foregoing multi-function valve assemblies, during the degassing position, the first valve body is configured to move apart from the second valve body to establish a gas path through the valve housing.

In a further non-limiting embodiment of any of the foregoing multi-function valve assemblies, the additional position is a leak test position of the multi-function valve assembly.

In a further non-limiting embodiment of any of the foregoing multi-function valve assemblies, during the leak test position, the second valve body is configured to move apart from the first valve body.

In a further non-limiting embodiment of any of the foregoing multi-function valve assemblies, a water-impermeable membrane is secured to the second valve body.

In a further non-limiting embodiment of any of the foregoing multi-function valve assemblies, the water-impermeable membrane is configured to perform a pressure equalization function of the multi-function valve assembly during the default position.

In a further non-limiting embodiment of any of the foregoing multi-function valve assemblies, a seal is arranged to seal an interface between the first valve body and the second valve body during the default position.

In a further non-limiting embodiment of any of the foregoing multi-function valve assemblies, the seal is received within a groove formed in an outer flange of the first valve body.

An automotive component according to another exemplary aspect of the present disclosure includes, among other things, an enclosure wall, and a multi-function valve assembly received within an opening of the enclosure wall. The multi-function valve assembly is configurable in a default position in which a pressure is equalized between an interior of the automotive component and an atmosphere outside the automotive component, a degassing position in which a gaseous mixture is dischargeable from the interior to the atmosphere, and a leak test position for leak testing the automotive component without removing the multi-function valve assembly from the enclosure wall.

In a further non-limiting embodiment of the foregoing automotive component, the automotive component is a traction battery pack.

In a further non-limiting embodiment of either of the foregoing automotive components, a degassing valve body of the multi-function valve assembly is seated against a pressure equalization valve body of the multi-function valve assembly during the default position.

In a further non-limiting embodiment of any of the foregoing automotive components, the degassing valve body is unseated from the pressure equalization valve body during the degassing position.

In a further non-limiting embodiment of any of the foregoing automotive components, the degassing valve body is movable in a direction away from the interior to configure the multi-function valve assembly in the degassing position.

In a further non-limiting embodiment of any of the foregoing automotive components, the pressure equalization valve body is unseated from the degassing valve body during the leak test position.

In a further non-limiting embodiment of any of the foregoing automotive components, the pressure equalization valve body is movable in a direction toward the interior to configure the multi-function valve assembly in the leak test position.

In a further non-limiting embodiment of any of the foregoing automotive components, the multi-function valve assembly includes a water-impermeable membrane configured to equalize the pressure between the interior and the atmosphere during the default position.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary multi-function valve assemblies for use in automotive components, such as traction battery packs, for example. An exemplary multi-function valve assembly may include a valve housing; a first valve body movably positioned within the valve housing, and a second valve body movably positioned within the valve housing. The first and second valve bodies may be moved between positions in which the valve bodies are seated against one another and other positions in which the valve bodies are unseated relative to one another to provide various functions. The multi-function valve assembly may be configured to provide a functions such as degassing, pressure equalization, leak testing, etc. These and other features are discussed in greater detail in the following paragraphs of this detailed description.

Figure 1:
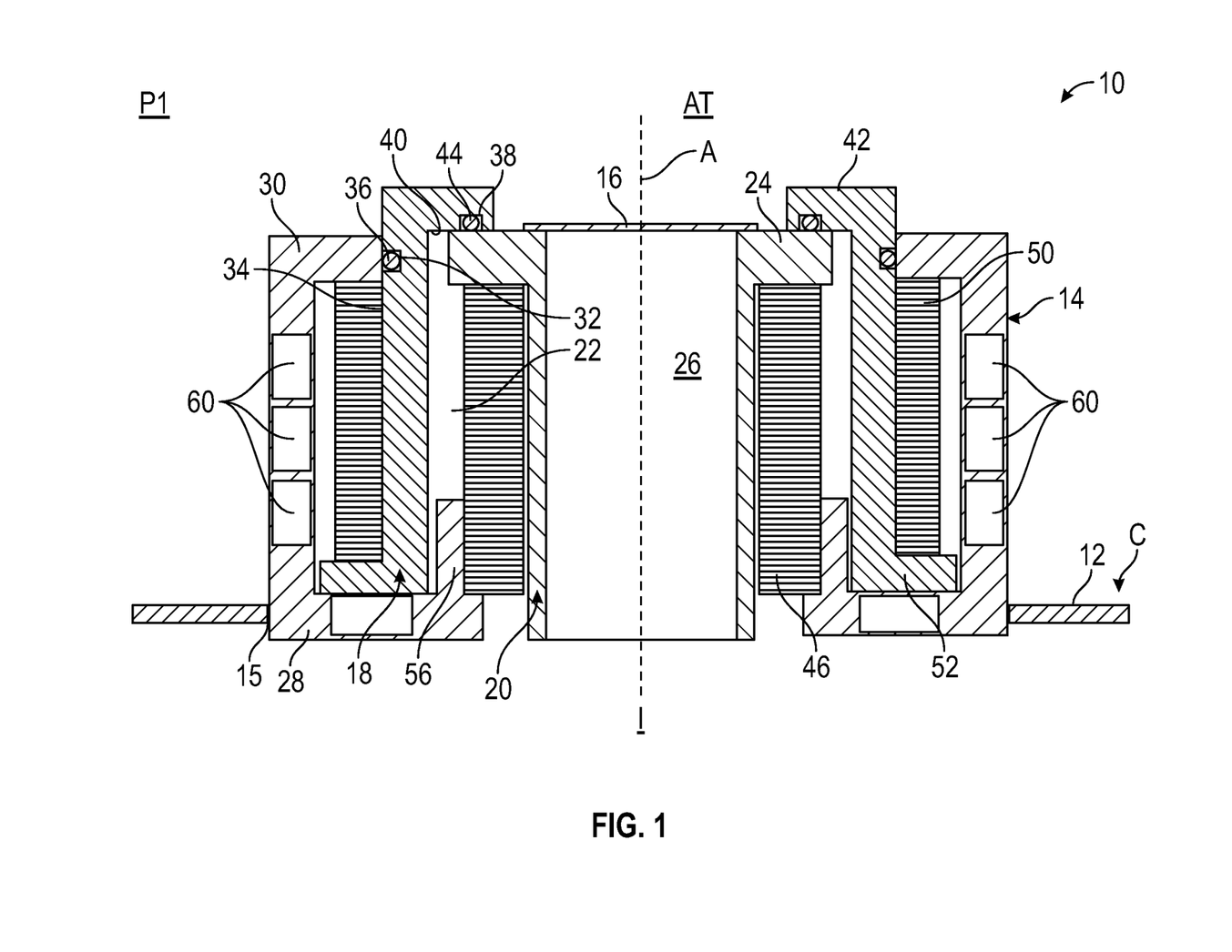
FIG. 1 illustrates a first exemplary position of a multi-function valve assembly.
Figure 2:
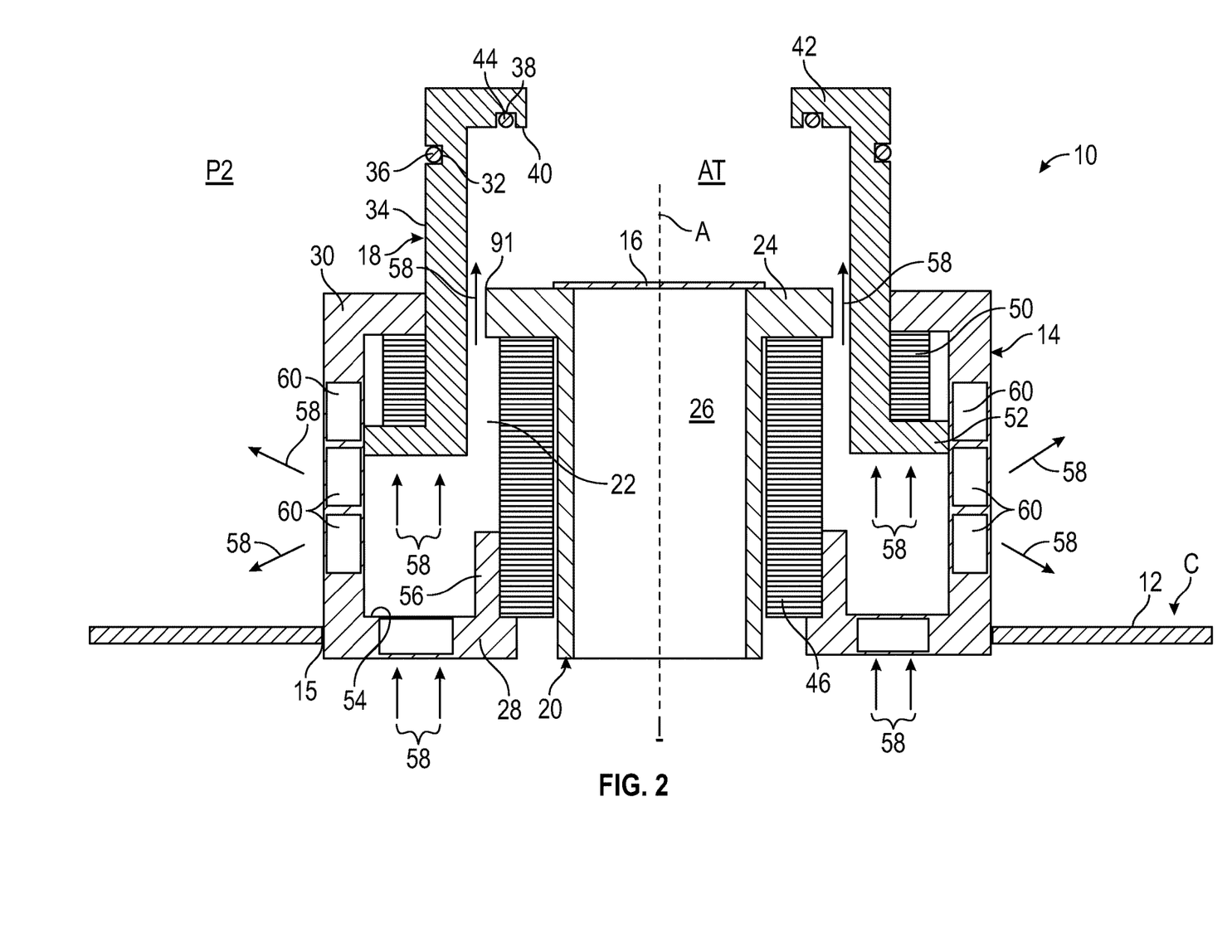
FIG. 2 illustrates a second exemplary position of the multi-function valve assembly of FIG. 1.
Figure 3:
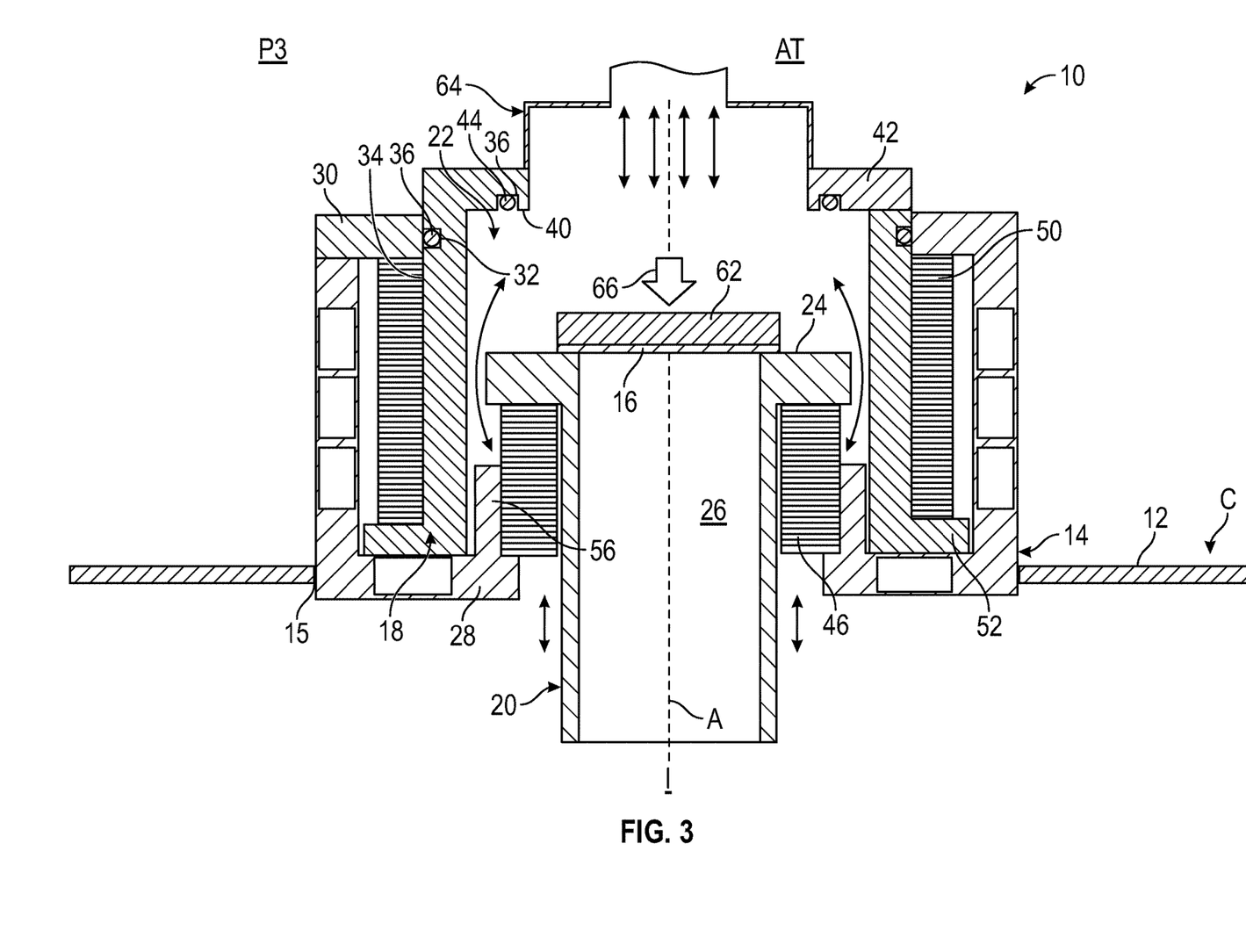
FIG. 3 illustrates a third exemplary position of the multi-function valve assembly of FIG. 1.

FIGS. 1, 2, and 3 illustrate a multi-function valve assembly 10 (hereinafter "valve assembly") according to an embodiment of this disclosure. The valve assembly 10 may be disposed within an opening 15 of an enclosure wall 12 of an automotive component C, such as a traction battery pack, a transmission component, a degas function component, a brake component, a fuel tank, a differential box, or any other automotive component in which it is desirable to fill or evacuate any fluid (e.g., air, liquid, or Gas) and also provide pressure equalization and/or other functionalities at a single location of the component. The valve assemblies of this disclose could also be utilized in certain medical components and thus are not limited to automotive applications.

Although a single valve assembly 10 is provided in the enclosure wall 12 in the illustrated embodiments, the automotive component C could include a greater number of valve assemblies 10 within the scope of this disclosure. The valve assembly 10 may be secured within the enclosure wall 12 in any known manner.

Among other components, the valve assembly 10 may include a valve housing 14, a water-impermeable membrane 16, a degassing valve body 18, and a pressure equalization valve body 20. The valve housing 14 may be a plastic component or a metallic component and may include a single-piece structure or a multi-piece structure. The size and shape of the valve housing 14 are not intended to limit this disclosure.

The valve housing 14 may include an internal bore 22 that extends along a longitudinal centerline axis A between an inner section 28 and an outer section 30. The inner section 28 interfaces with the enclosure wall 12, and the outer section 30 protrudes outward of the enclosure wall 12. The outer section 30 is therefore located further away from an interior I of the automotive component C compared to the inner section 28.

The degassing valve body 18 and the pressure equalization valve body 20 may each be accommodated within the internal bore 22 of the valve housing 14. In an embodiment, the pressure equalization valve body 20 is positioned to extend coaxially along the longitudinal centerline axis A, and the degassing valve body 18 may circumscribe the pressure equalization valve body 20 within the internal bore 22. Thus, the degassing valve body 18 may be radially outward of the pressure equalization valve body 20.

The water-impermeable membrane 16 may be secured to an outer flange 24 of the pressure equalization valve body 20. The water-impermeable membrane 16 may therefore be arranged to substantially cover an internal bore 26 of the pressure equalization valve body 20. The water-impermeable membrane 16 may be a patch, filter, or some other porous membrane.

A groove 32 may be formed in a circumferential wall 34 of the degassing valve body 18. A first seal 36 may be received within the groove 32. The first seal 36 may be configured to seal an interface between the degassing valve body 18 and the outer section 30 of the valve housing 14. The first seal 36 could be a bore seal, an adhesive seal, a press-in-place seal, a carrier gasket, a form in place sealant, or any other suitable sealing device/agent.

Another groove 38 may be formed in an inner surface 40 of an outer flange 42 of the degassing valve body 18. The outer flange 42 may protrude outwardly of the outer section 30 of the valve housing 14 in a default position (shown in FIG. 1) of the valve assembly 10.

A second seal 44 may be received within the groove 38. The second seal 44 may be configured to seal an interface between the degassing valve body 18 and the pressure equalization valve body 20. The second seal 44 could be a bore seal, an adhesive seal, a press-in-place seal, a carrier gasket, a form in place sealant, or any other suitable sealing device/agent.

A first biasing member 46 may be arranged to extend between the inner section 28 of the valve housing 14 and the outer flange 24 of the pressure equalization valve body 20. In a default position of the valve assembly 10, the first biasing member 46 may bias the pressure equalization valve body 20 in a direction away from the interior I to seat the outer flange 24 against the inner surface 40 of the outer flange 42 of the degassing valve body 18. The first biasing member 46 could be a spring, a resilient insert (e.g., rubber grommet, etc.), or any other suitable biasing device.

A second biasing member 50 may be arranged to extend between an inner flange 52 of the degassing valve body 18 and the outer section 30 of the valve housing 14. In a default position of the valve assembly 10, the second biasing member 50 may bias the degassing valve body 18 in a direction toward the interior I to seat the inner flange 52 against an inner surface 54 (see FIG. 2) of the inner section 28 of the valve housing 14. The second biasing member 50 could be a spring, a resilient insert (e.g., rubber grommet, etc.), or any other suitable biasing device.

A cylindrical wall 56 may protrude from the inner surface 54 of the inner section 28 of the valve housing 14. The cylindrical wall 56 may help locate the degassing valve body 18 within the valve housing 14. The cylindrical wall 56 may further help separate the first biasing member 46 from the degassing valve body 18.

FIG. 1 shows a first or default position P1 of the valve assembly 10. In this position, the water-impermeable membrane 16 of the valve assembly 10 is configured to allow gases to flow in and out of the automotive component C while preventing moisture, particle contaminants, etc. from entering an interior I of the automotive component C during normal operating conditions. The water-impermeable membrane 16 may therefore provide pressure equalization between the interior I of the automotive component C and an atmosphere AT outside the enclosure wall 12 of the automotive component C.

FIG. 2 shows a second or degassing position P2 of the valve assembly 10. The degassing valve body 18 may be configured to move (e.g., in a direction parallel to the longitudinal centerline axis A) from the default position P1 shown in FIG. 1 to the degassing position P2 shown in FIG. 2 during a thermal event of the automotive component C. For example, during a thermal event, a gaseous mixture 58 (e.g., gases, effluent particles, and/or other byproducts) can increase the pressure inside the interior I of the automotive component C. When the increased pressure exceeds a predefined threshold, the pressure may overcome the biasing force of the second biasing member 50, thereby forcing the degassing valve body 18 to move in a direction away from the interior I and unseat itself relative to the pressure equalization valve body 20 and the inner section of the valve housing 14. The gaseous mixture 58 may then enter the internal bore 22 of the valve housing 14 prior to being discharged from the valve housing 14. The gaseous mixture 58 may be discharged from the valve assembly 10 through a now opened space 99 between the degassing valve body 18 and the pressure equalization valve body 20 and/or through multiple vent passages 60 formed in the valve housing 14.

FIG. 3 shows a third or leak test position P3 of the valve assembly 10. The pressure equalization valve body 20 may be configured to move (e.g., in a direction parallel to the longitudinal centerline axis A) from the default position P1 of FIG. 1 to the leak teat position P3 of FIG. 3 when leak testing the automotive component C. For example, during a leak test, a block-off plate 62 may be secured over top of the water-impermeable membrane 16, and a leak test device 64 may be attached to the valve assembly 10 (e.g., to the outer flange 42 of the degassing valve body 18). The leak test device 64 may be configured to either introduce air into the interior I or apply a vacuum to the interior I as part of a procedure for leak testing the automotive component C.

During the leak test, a force 66 may be applied to the block-off plate 62. The force 66 may be applied by the leak test device 64 or some other device. When the force 66 exceeds a predefined threshold, the force 66 may overcome the biasing force of the first biasing member 46, thereby forcing the pressure equalization valve body 20 to move in a direction toward the interior I and unseat itself relative to the degassing valve body 18. The air/vacuum may then be applied to the interior I as part of the procedure for leak testing the automotive component C. The leak test can therefore be performed without first removing the valve assembly 10 from the enclosure wall 12.

Notably, the pressure equalization valve body 20 remains stationary and in its default position relative to the valve housing 14 during the degassing position P2, and the degassing valve body 18 remains stationary and in its default position relative to the valve housing 14 during the leak test position P3.

In an embodiment, the degassing valve body 18 and the pressure equalization valve body 20 are each configured as poppet-type valves. However, these valve bodies could embody other configurations within the scope of this disclosure.

Figure 4:
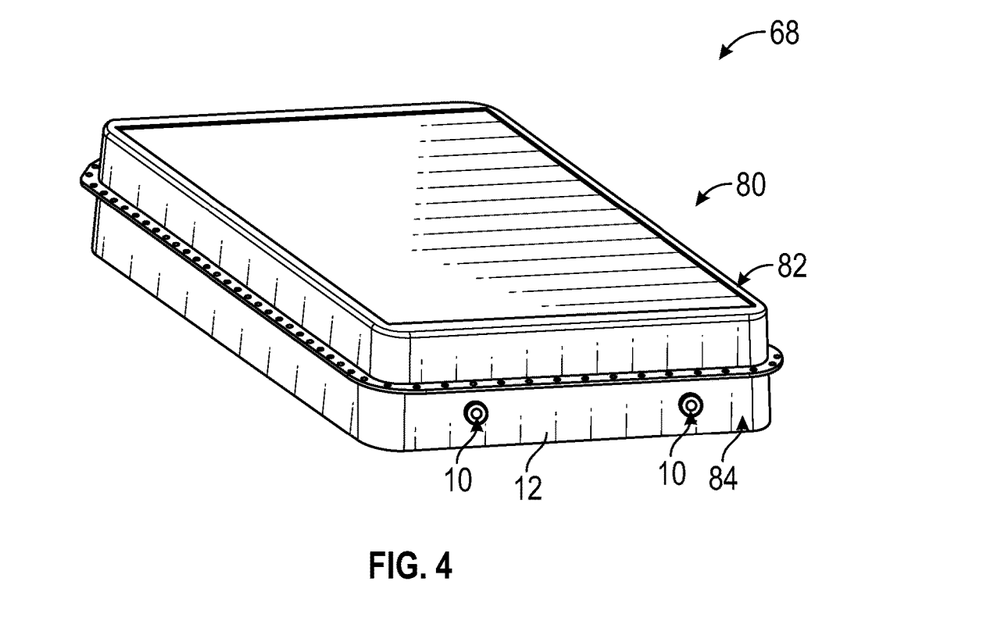
FIG. 4 illustrates a traction battery pack that includes a multi-function valve assembly.
Figure 5:
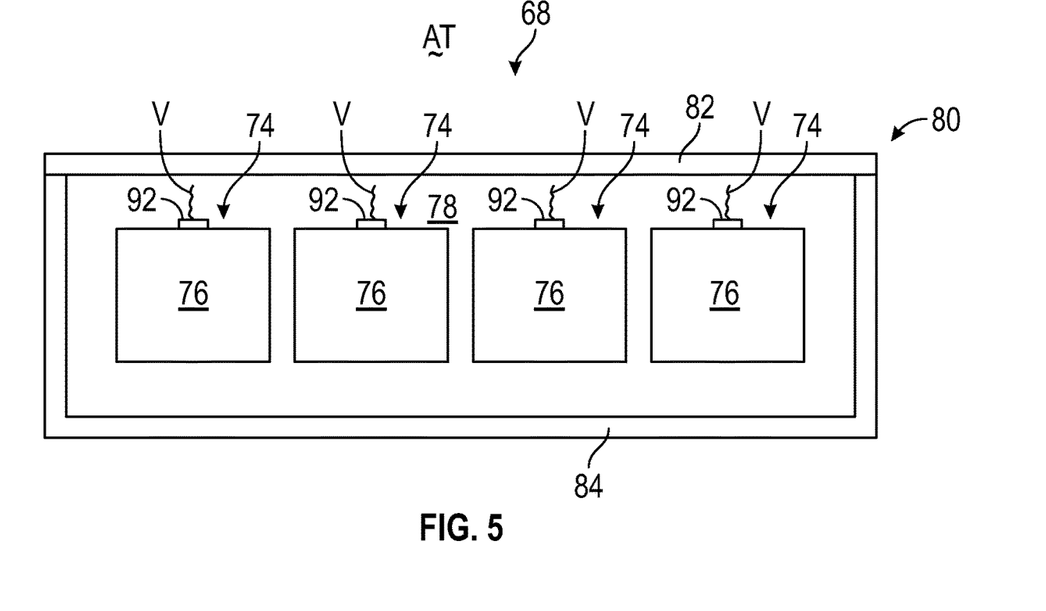
FIG. 5 is a cross-sectional view of the traction battery pack of FIG. 4.
Figure 6:
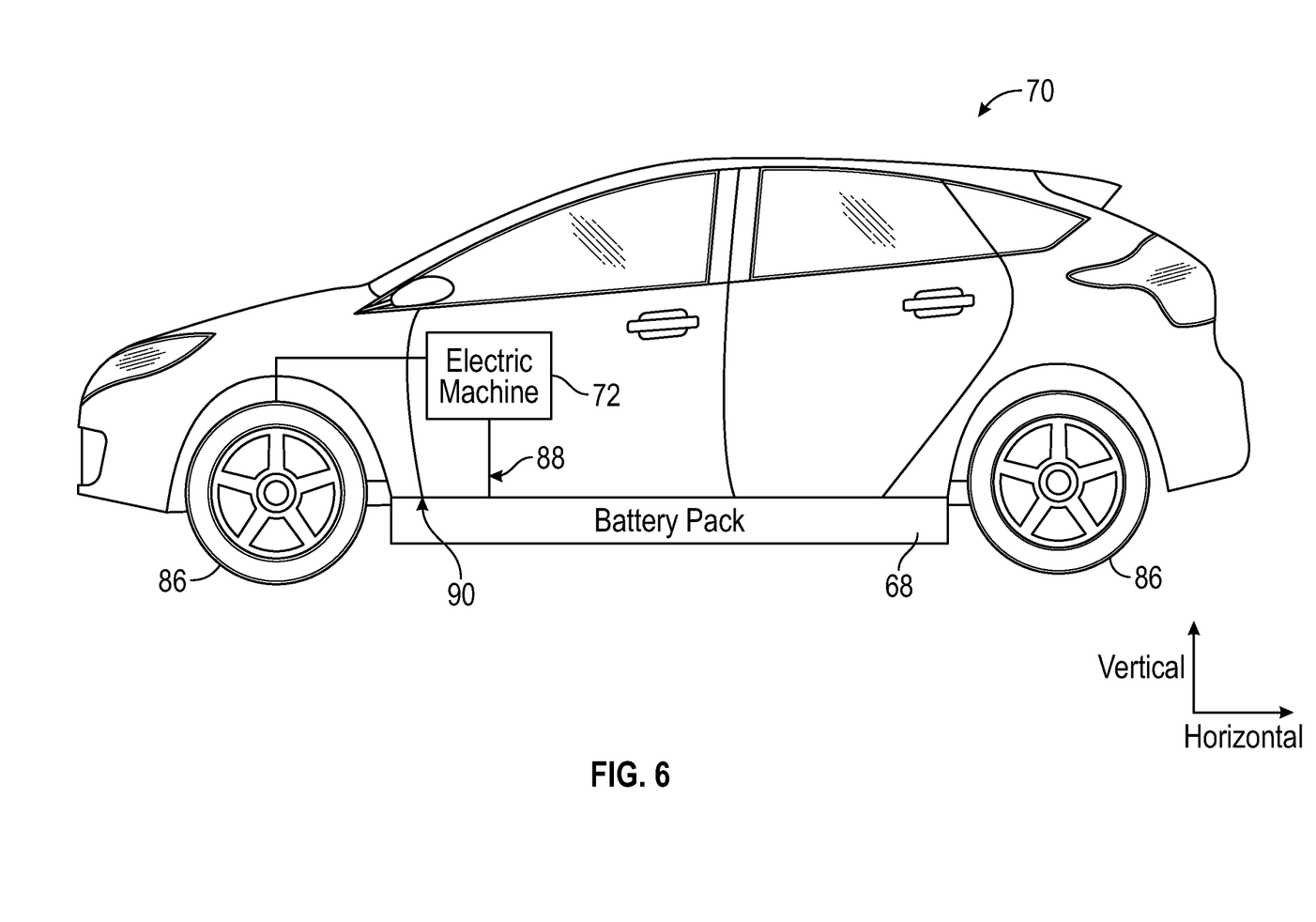
FIG. 6 illustrates an electrified vehicle that includes the traction battery pack of FIGS. 4 and 5.

FIGS. 4, 5, and 6 illustrate an exemplary automotive component within which the valve assembly 10 described above may be employed. In this implementation, the valve assembly 10 is part of a traction battery pack 68 of an electrified vehicle 70 (see FIG. 6). Again, however, other automotive implementations could benefit from use of the valve assembly 10 within the scope of this disclosure.

The electrified vehicle 70 may include any type of electrified powertrain. In the illustrated embodiment, the electrified vehicle 70 is a full electric vehicle propelled solely through electric power, such as by one or more electric machines 72, without assistance from an internal combustion engine. The electric machine 72 may operate as an electric motor, an electric generator, or both. The electric machine 72 receives electrical power and can convert the electrical power to torque for driving one or more wheels 86 of the electrified vehicle 70. A voltage bus 88 may electrically couple the electric machine 72 to the traction battery pack 68.

The traction battery pack 68 may be secured to an underbody 90 of the electrified vehicle 70. However, the traction battery pack 68 could be located elsewhere on the electrified vehicle 70 within the scope of this disclosure The traction battery pack 68 may be a high voltage traction battery pack system that includes one or more battery arrays 74 (e.g., battery assemblies or groupings of rechargeable battery cells 76) capable of outputting electrical power to power an electric machine 72 and/or other electrical loads of the electrified vehicle 70. Other types of energy storage devices and/or output devices could alternatively or additionally be used to electrically power the electrified vehicle 70.

The battery cells 76 may be stacked side-by-side along a stack axis to construct a grouping of battery cells 76, sometimes referred to as a "cell stack." In the highly schematic depiction of FIG. 5, the battery cells 76 are stacked in a direction into the page to construct each battery array 74, and thus the battery arrays 74 may extend in cross-car direction. However, other configurations may also be possible. The total number of battery arrays 74 and battery cells 76 provided within the traction battery pack 68 is not intended to limit this disclosure.

In an embodiment, the battery cells 76 of each battery array 74 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery arrays 74 and various other battery internal components (e.g., bussed electrical center, battery electric control module, wiring, connectors, etc.) may be housed within an interior area 78 of an enclosure assembly 80. The enclosure assembly 80 may include an enclosure cover 82 and an enclosure tray 84. The enclosure cover 82 may be secured (e.g., bolted, welded, adhered, etc.) to the enclosure tray 84 to provide the interior area 78. The size, shape, and overall configuration of the enclosure assembly 80 is not intended to limit this disclosure.

The traction battery pack 68 may include one or more of the valve assemblies 10. The valve assembly 10 may be disposed within an enclosure wall 12 of the enclosure assembly 80. The enclosure wall 12 may be part of the enclosure cover 82, the enclosure tray 84, or both. The exact mounting location of each valve assembly 10 could vary and is therefore not intended to limit this disclosure.

Each battery cell 76 of the traction battery pack 68 may include a vent port 92 (see FIG. 5). The vent ports 92 are configured to expel battery vent byproducts V, such as gases, effluent particles, and/or other vent byproducts, from the battery cells 76 during certain battery thermal events. A battery thermal event may occur, for example, during overcharging conditions, over-discharging conditions, or during other conditions.

The valve assemblies 10 may operate in the manner illustrated in FIG. 1 to provide pressure equalization between the interior area 78 of the traction battery pack 68 and atmosphere AT outside of the traction battery pack 68. The valve assemblies 10 may operate in the manner illustrated in FIG. 2 to degas the battery vent byproducts V during a battery thermal event. The valve assemblies 10 may operate in the manner illustrated in FIG. 3 to leak test the enclosure assembly 80 of the traction battery pack 68.

The exemplary valve assemblies of this disclosure provide a multi-functional design (e.g., capable of degassing, providing pressure equalization, and/or providing leak testing) for addressing fluid and gaseous management of certain automotive components. The valve assembles are relatively simply to assemble and manufacture and do not require complex modifications to the automotive component sealing strategy.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A multi-function valve assembly, comprising:
    a valve housing;
    a first valve body movably positioned within the valve housing;
    a second valve body movably positioned within the valve housing,
    wherein the first valve body is seated against the second valve body in a default position of the multi-function valve assembly and is unseated relative to the second valve body in an additional position of the multi-function valve assembly; and
    a water-impermeable membrane secured to the second valve body.

2. The multi-function valve assembly as recited in claim 1, wherein the first valve body is degassing valve body, and the second valve body is a pressure equalization valve body.

3. The multi-function valve assembly as recited in claim 1, comprising a biasing member configured to bias the second valve body against the first valve body during the default position.

4. The multi-function valve assembly as recited in claim 1, comprising a biasing member configured to bias the first valve body against the valve housing during the default position.

5. The multi-function valve assembly as recited in claim 1, wherein the additional position is a degassing position of the multi-function valve assembly.

6. The multi-function valve assembly as recited in claim 5, wherein during the degassing position, the first valve body is configured to move apart from the second valve body to establish a gas path through the valve housing.

7. The multi-function valve assembly as recited in claim 1, wherein the additional position is a leak test position of the multi-function valve assembly.

8. The multi-function valve assembly as recited in claim 7, wherein during the leak test position, the second valve body is configured to move apart from the first valve body.

9. The multi-function valve assembly as recited in claim 1, wherein the water-impermeable membrane is configured to perform a pressure equalization function of the multi-function valve assembly during the default position.

10. The multi-function valve assembly as recited in claim 1, comprising a seal arranged to seal an interface between the first valve body and the second valve body during the default position.

11. The multi-function valve assembly as recited in claim 10, wherein the seal is received within a groove formed in an outer flange of the first valve body.

12. The multi-function valve assembly as recited in claim 11, comprising a second seal arranged to seal an interface between the first valve body and the valve housing.

13. The multi-function valve assembly as recited in claim 12, wherein the second seal is received within a second groove formed in a circumferential wall of the first valve body.

14. The multi-function valve assembly as recited in claim 1, wherein the first valve body circumscribes an outer flange of the second valve body in both the default position and the additional position.

15. The multi-function valve assembly as recited in claim 1, wherein the first valve body and the second valve body are both poppet-type valves.

16. An automotive component comprising the multi-function valve assembly as recited in claim 1.

17. The automotive component as recited in claim 16, wherein the automotive component is a traction battery pack.

18. The automotive component as recited in claim 16, wherein the multi-function valve assembly is received within an opening of an enclosure wall of the automotive component such that a first portion of the multi-function valve assembly extends within an interior of the automotive component and a second portion of the multi-function valve assembly extends outside the interior and thus interfaces with an atmosphere outside the automotive component.

* * * * *